United States Patent Office 3,222,015
Patented Dec. 7, 1965

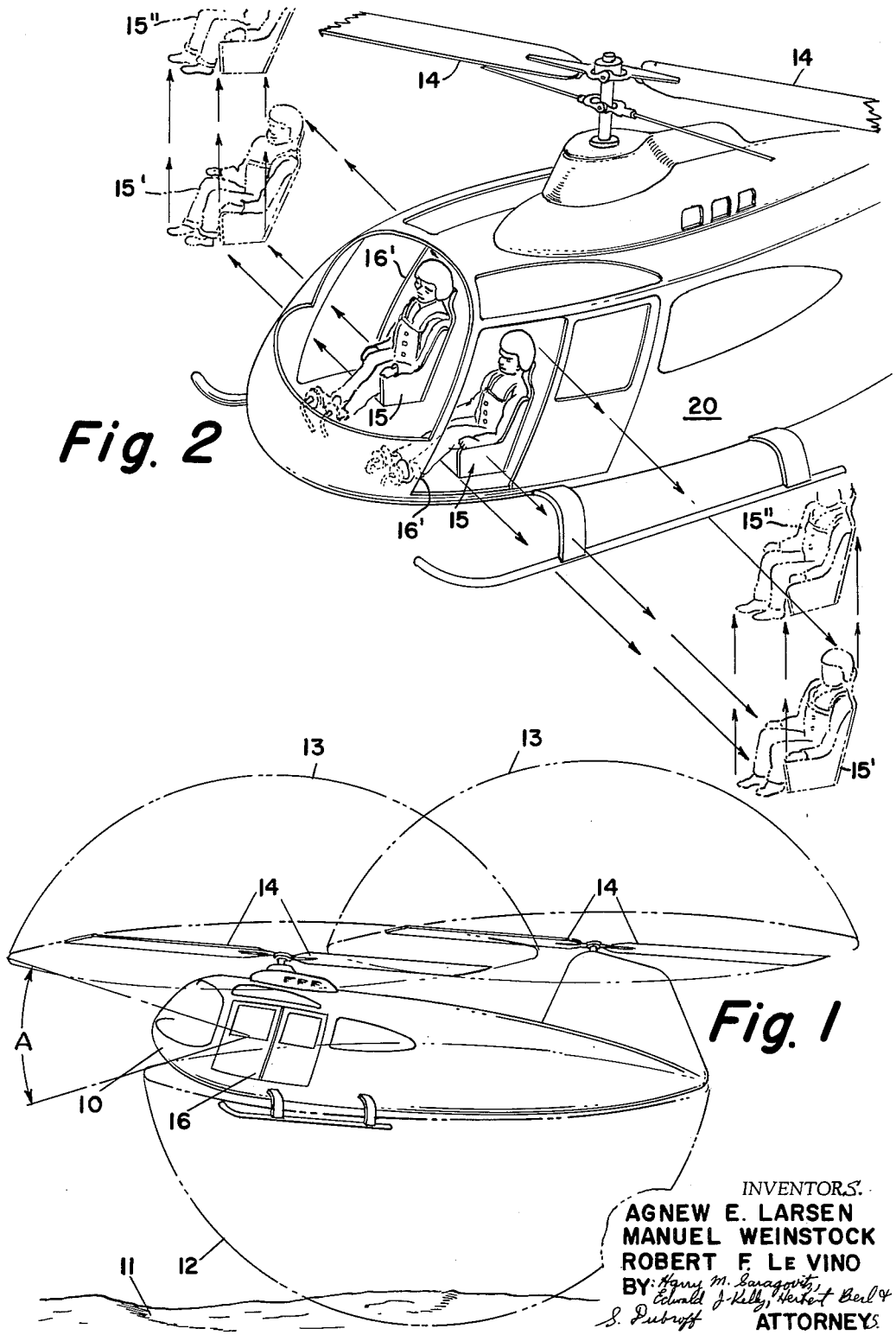

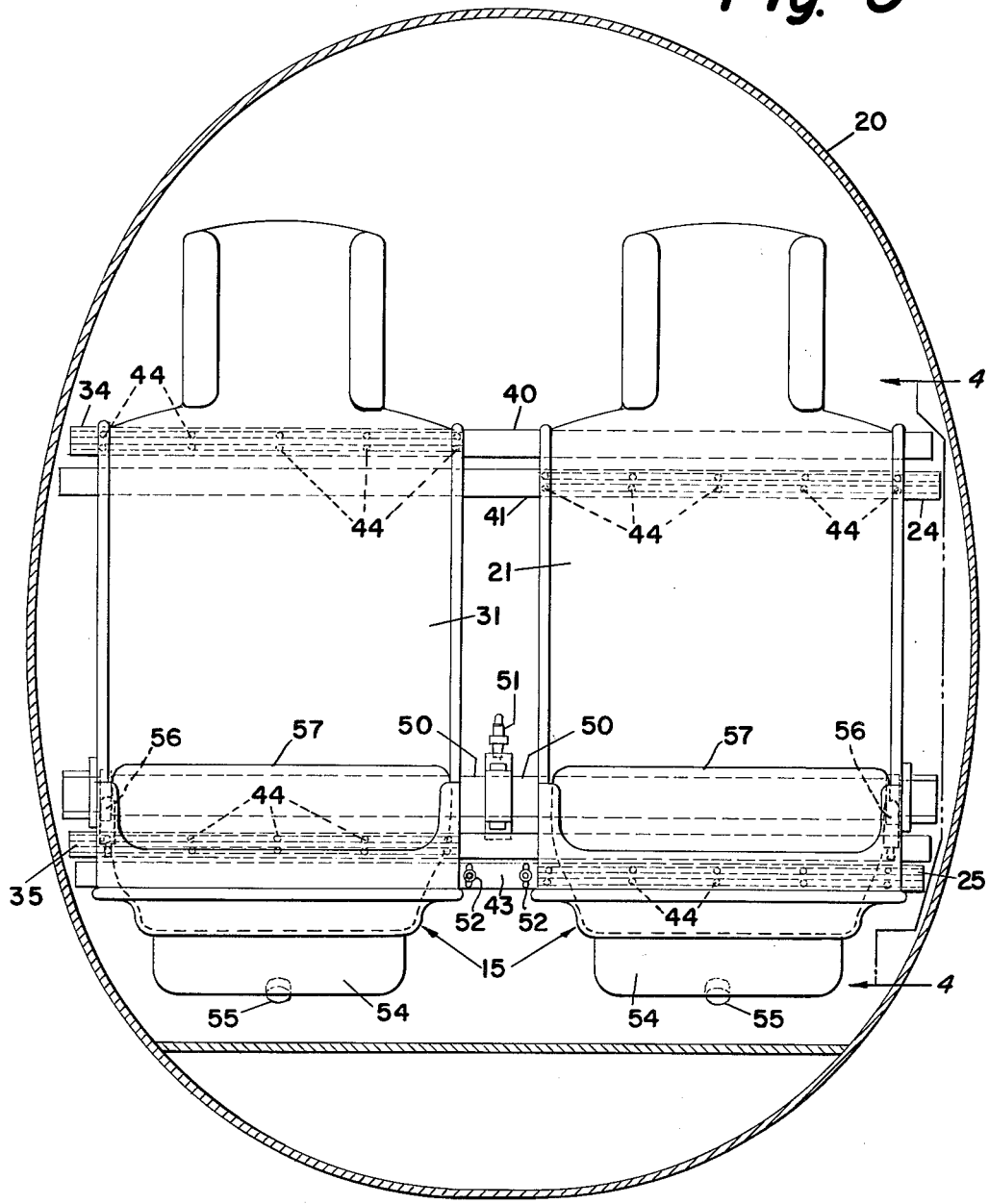

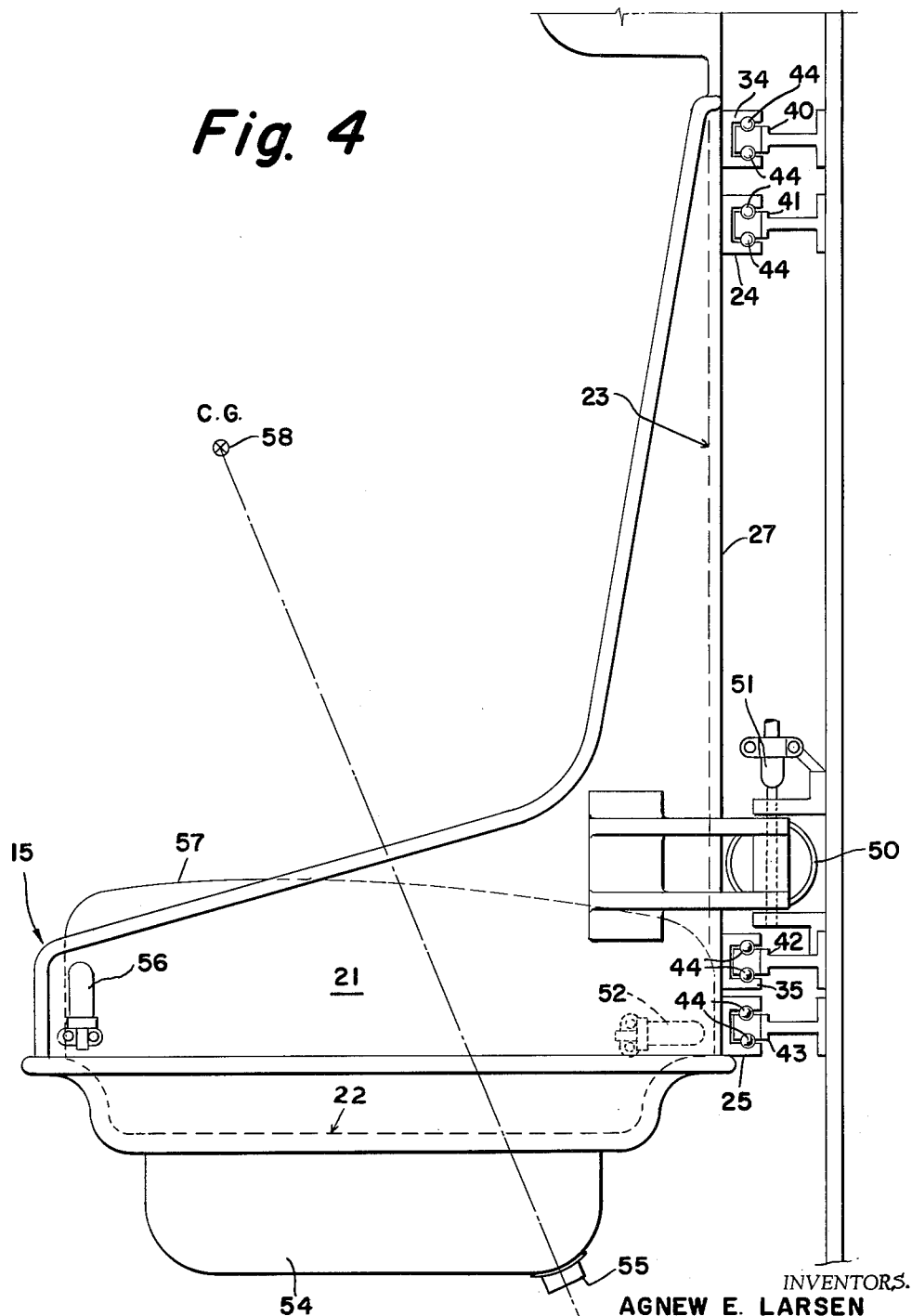

3,222,015
HELICOPTER ESCAPE MEANS
Agnew E. Larsen, New Britain, Manuel Weinstock, Philadelphia, and Robert F. Le Vino, Huntingdon Valley, Pa., assignors to the United States of America as represented by the Secretary of the Army
Filed Apr. 23, 1964, Ser. No. 362,210
10 Claims. (Cl. 244—141)
(Granted under Title 35, U.S. Code (1952), sec. 266)

The invention described herein may be manufactured and used by or for the Government for governmental purposes without the payment to use of any royalty thereon.

This invention relates to aircraft escape means and, more particularly, to the occupant safe recovery problem encountered in the case of troubled helicopters, and is equally applicable to all helicopter constructions.

Ballistic escape techniques in disabled airplane evacuation has thus far evaded direct application to helicopters primarily due to the presence of overhead rotary blades, especially where the craft is at its unique low altitude of flight that precludes normal parachute deployment.

The primary object of the invention is to provide an emergency helicopter escape system that overcomes the foregoing hazards.

Another object of the invention is to provide such a system whereby the tips of the rotor blades are cleared and sufficient altitude gained, thus enabling safe parachute deployment.

In one aspect of the invention a particular seat structure is securable within a helicopter fuselage for accommodating an occupant and has means thereon for both catapulting the seat laterally of the fuselage a predetermined distance and then rocketing it to an altitude position to permit safe parachute deployment.

These and other objects, advantages and features will become apparent from the following description of the invention when taken in conjunction with the drawings in which:

FIG. 1 is an elevational view of a helicopter at low altitude indicating the obstacles confronted in providing an emergency escape system.

FIG. 2 is a perspective view of the craft of FIG. 1 indicating the manner of occupant escape in accordance with the principles of the invention.

FIG. 3 is a front elevational view of the seating arrangement for occupants in the craft.

FIG. 4 is a sectional view taken along line 4—4 of FIG. 3.

The helicopter 10 (FIG. 1) is shown in a normal low altitude flight at an elevation above the terrain 11 which would preclude conventional parachute deployment by escaping occupants. Should the craft 10 have encountered trouble that would preclude continued safe occupancy, the very nature of the craft presents certain dangerous areas to a contemplated escapee. Area 12, defined by the dotted substantially hemispherical zone, is un-safe due to the close proximity of the terrain 11 or adjacent ground. Areas 13, 13, as represented by similar hemispherical zones, obviously are extremely dangerous since they encompass the whirling rotor blades 14.

It has been found that the opposed surfaces of zones 12 and 13 present an initially safe lateral region of escape area subtending an angle A of about 30° to 40°. Thus, it is within this boundary that the initial phase of the emergency escape system is restricted.

Each of the plurality of occupant seat apparatus, shown generally at 15 (FIGS. 2, 3, 4), is provided with sufficient guiding track means and closed ballistic or power means to provide lateral egress of the respective man-seat combination through one of the openings 16′ (provided by occupant's prior ballistic jettisoning of respective door means 16) and therepast a predetermined distance well beyond the lateral extent of rotating rotor blades 14. Each seat apparatus is also provided with sufficient open ballistic or rocket means, appropriately arranged and synchronized with the closed ballistic means, to elevate the man-seat combination to an altitude position which enables safe parachute deployment. Synchronization of the closed and open ballistic means is such that the respective man-seat arrangement is powered outwardly, as shown at 15′, in the first stage of ejection to a position well clear of the rotor blade tips, before the open ballistic or second power stage of ejection commences to elevate the laterally ejected arrangement toward the desired altitude as shown at 15″.

More specifically, the craft fuselage 20 is of sufficient size to accommodate a pair of seat structures 15. Seat 21 includes an upwardly facing seat portion 22 for normally supporting a substantial portion of its occupant's weight and a forwardly facing back portion 23 that extends above the seat portion 22 at a predetermined angular relationship. Vertically and substantially spaced, horizontally disposed channel tracks 24, 25 are rigidly secured across the rearward surface 27 of the back portion 23 at extreme upper and lower positions therealong. Seat 31 is substantially identical to seat 21 and has rigidly secured across upper and lower extremities of its back portion rearward surface, vertically spaced tracks 34, 35 which are parallel to tracks 24, 25. Each of tracks 24, 25, 34, 35 are parallel to the other back-mounted tracks and are translatably mounted upon appropriately arranged mating track means 40, 41, 42, 43 rigidly secured in parallelism to and extending completely across the fuselage 20. Preferably, a plurality of horizontally spaced pairs of roller means 44 are employed along the mating track members to facilitate rapid seat ejection upon actuation of the respective horizontally disposed catapult arrangement 50.

As is well known to those skilled in the art, closed ballistic means may be defined as means consisting of an outer cylinder at 50 containing one or more axially movable pistons (not shown) energized by the products of propellant combustion. Preferably the outer cylinder is rigidly secured to the basic aircraft structure and its piston arrangement is appropriately secured to the seat structures. A major reason for use of closed ballistic means, one of which being a catapult, is for avoidance of fire.

On the other hand, the open ballistic system was chosen for use once the seat is removed from the fuselage because, unlike the catapult, there is no need for avoidance of fire and the products of combustion are ejected freely into the atmosphere through a nozzle-shaped device 55, propulsion being derived from the external reaction of the products of combustion.

The closed ballistic or catapult means 50 on each seat are initiated by an occupant therein actuating a lanyard (not shown) of a central initiating means 51 which preferably is provided for simultaneous actuation of both ballistic catapult portions 50. However, the initiating means may be arranged for sequential actuation of the catapult portions. A standard M3 or M5 type catapult has been found satisfactory when its initiator 51 is suitably combined with a one-half second delay initiator 52, the firing of initiator 52 providing proper sequential actuation of a preferred pan-type rocket motor 54 that is located directly under each seat and includes means 55 for directing rocket thrust through the center of gravity 58 of the man-seat mass. Preferably, a similar half second delay initiator 56 is employed to actuate the parachute drogue gun normally associated with the parachute pack 57 when the desired elevation has been attained.

Certain modifications, alterations or changes may be resorted to without departing from the scope of the invention as defined in the appended claims.

We claim:
1. A seat construction for helicopters comprising
   a seat structure having an upwardly facing seat member for normally supporting a substantial portion of the weight of a helicopter occupant and a forwardly facing back member extending above said seat member at a predetermined angular relationship;
   horizontally disposed track means affixed to the rearward surface of said back member for guiding lateral movement of said seat structure along mating horizontally disposed supporting track means;
   catapult means extending substantially horizontally along said back member rearward surface for laterally ejecting said seat structure and its occupant in their upright positions a predetermined distance beyond an opened adjacent door frame of said helicopter; and
   rocket means carried by said seat structure for subsequent rocketing of said laterally ejected seat structure and occupant to an altitude position allowing safe parachute deployment;
   so constructed and arranged that said seat structure and occupant may be moved to said altitude position after avoiding such dangers as moving rotor blades.
2. The arrangement in accordance with claim 1 wherein said rocket means includes a delayed ignition means.
3. A seat construction for helicopters comprising
   a seat structure having an upwardly facing seat member for normally supporting a substantial portion of the weight of a helicopter occupant and a forwardly facing back member extending above said seat member at a predetermined angular relationship;
   horizontally disposed track means affixed to the rearward surface of said back member for guiding lateral movement of said seat structure along mating horizontally disposed supporting track means;
   closed ballistic means extending substantially horizontally along said back member rearward surface for laterally ejecting said seat structure and its occupant in their upright positions a predetermined distance beyond an opened adjacent door frame of said helicopter; and
   open ballistic means carried by said seat structure for subsequent rocketing of said laterally ejected seat structure and occupant substantially normal to said lateral movement to an altitude position allowing safe parachute deployment;
   so constructed and arranged that said seat structure and occupant may be moved to said altitude position after avoiding such dangers as moving rotor blades.
4. The structure as defined in claim 3 in which the open ballistic means includes a delayed ignition means.
5. In a helicopter having a fuselage and rotary blades thereabove;
   vertically spaced, horizontal track means extending transversely across and rigidly supported by said fuselage;
   jettisonable escape door means removably secured in the fuselage side wall adjacent said transverse track means;
   a seating arrangement adjacent said door means and including an upwardly facing seat member for normally supporting a substantial portion of the helicopter occupant weight and a forwardly facing back member extending above said seat member at a predetermined angular relationship;
   horizontally disposed track means affixed to the rearward surface of said back member slidingly supported along at least a portion of said transverse track means for guiding lateral movement of said seat arrangement toward and through an access opening provided by removal of said door means;
   closed ballistic means extending substantially horizontally along said back member rearward surface for laterally ejecting said seating arrangement through said access opening to a predetermined position outward of said blades; and
   open ballistic means carried by said seating arrangement for subsequent rocketing of said laterally ejected seating arrangement to an altitude position allowing safe parachute deployment;
   so constructed and arranged that said seating arrangement may be moved to said altitude position after avoiding said rotary blades.
6. A seat construction for helicopters comprising,
   a seat structure securable within a helicopter fuselage for accommodating an occupant,
   means on said seat structure for catapulting said seat structure laterally of said fuselage a predetermined distance, and
   means on said seat structure for rocketing said seat structure to an altitude position allowing safe parachute deployment,
   so constructed and arranged that said seat structure and occupant may be moved to said altitude position after avoiding such dangers as moving rotor blades.
7. In a helicopter having a fuselage containing a man-seat apparatus and a sustaining rotor overlying said apparatus, sequential means for safely ejecting in one direction and then elevating in another direction said man-seat apparatus from said fuselage and in avoidance of the rotor to an altitude position allowing safe parachute deployment.
8. In a helicopter having a fuselage, first stage means for sequentially and safely ejecting in one direction and second stage means for elevating in another direction a man-seat apparatus from said fuselage to an altitude position allowing safe parachute deployment.
9. In an aircraft having a sustaining rotor, first stage means for sequentially and safely ejecting in one direction and second stage means for elevating in another direction a man-seat apparatus from said aircraft and in avoidance of the rotor to an altitude position allowing safe parachute deployment.
10. In a helicopter having a sustaining rotor, first stage means for sequentially and safely ejecting in one direction and second stage means for elevating in another direction a man-seat apparatus from said helicopter and in avoidance of the rotor to an altitude position allowing safe parachute deployment.

References Cited by the Examiner
UNITED STATES PATENTS

| | | | |
|---|---|---|---|
| 1,721,450 | 7/1929 | Hooper | 244—7 |
| 2,358,603 | 9/1944 | Southerland | 244—122 |
| 2,390,230 | 12/1945 | Trusty | 244—141 |
| 2,521,684 | 9/1950 | Bates | 244—17.15 |
| 2,806,666 | 9/1957 | Brown et al. | 244—122 XR |
| 2,806,667 | 9/1957 | Kugler | 244—141 |
| 2,953,331 | 9/1960 | Holcomb et al. | 244—122 |

MILTON BUCHLER, *Primary Examiner.*
FERGUS S. MIDDLETON, *Examiner.*